United States Patent
Nagasawa

(10) Patent No.: US 11,603,073 B2
(45) Date of Patent: Mar. 14, 2023

(54) OUTSIDE PROTECTION APPARATUS FOR VEHICLE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 10 days.

(21) Appl. No.: 17/082,412

(22) Filed: Oct. 28, 2020

(65) Prior Publication Data

US 2021/0197755 A1 Jul. 1, 2021

(30) Foreign Application Priority Data

Dec. 27, 2019 (JP) .............................. JP2019-239819

(51) Int. Cl.
*B60R 21/36* (2011.01)
*B60R 21/34* (2011.01)
*B60R 21/0134* (2006.01)

(52) U.S. Cl.
CPC .......... *B60R 21/36* (2013.01); *B60R 21/0134* (2013.01); *B60R 2021/346* (2013.01)

(58) Field of Classification Search
CPC .......................... B60R 21/36; B60R 2021/346
See application file for complete search history.

(56) References Cited

U.S. PATENT DOCUMENTS

| 8,016,066 | B1* | 9/2011 | Boxey | B60R 21/36 180/271 |
| 9,566,940 | B2* | 2/2017 | Suzuki | B60R 21/36 |
| 11,173,869 | B2* | 11/2021 | Nagasawa | B60R 21/36 |
| 2005/0269805 | A1* | 12/2005 | Kalliske | B60R 21/36 280/730.1 |
| 2019/0071050 | A1* | 3/2019 | Farooq | B60R 21/233 |
| 2019/0366972 | A1* | 12/2019 | Nakamura | B60R 21/36 |
| 2019/0375367 | A1* | 12/2019 | Aoki | B60R 21/2338 |
| 2019/0375368 | A1* | 12/2019 | Kanno | B60R 21/36 |
| 2021/0197756 | A1* | 7/2021 | Nagasawa | B60R 21/2338 |
| 2021/0197757 | A1* | 7/2021 | Nagasawa | B60R 19/205 |

FOREIGN PATENT DOCUMENTS

JP 2017-178205 A 10/2017

* cited by examiner

*Primary Examiner* — Barry Gooden, Jr.
(74) *Attorney, Agent, or Firm* — Smith, Gambrell & Russell, LLP

(57) ABSTRACT

An outside protection apparatus includes: an outside airbag device including an expandable member expandable rearward from a front portion of a body of a vehicle so as to be overlaid on a hood of the body, and an inflator that expands the expandable member; a collision detector that predicts or detects a collision between the body and a outside person outside the vehicle; and a controller that expands the expandable member when the collision detector predicts or detects a collision. The expandable member includes: a front bag portion expandable at the front portion of the body so as to be overlaid on the hood; a rear bag portion expandable in a location closer to rear than the front bag portion; and a tensile member coupled together with the rear bag portion to the body. The rear bag portion is expandable by the tensile member to stand on the hood.

19 Claims, 6 Drawing Sheets

FRONT ← - → REAR

FRONT ←→ REAR

OUTSIDE PROTECTION APPARATUS FOR VEHICLE

CROSS-REFERENCE TO RELATED APPLICATIONS

The present application claims priority from Japanese Patent Application No. 2019-239819 filed on Dec. 27, 2019, the entire contents of which are hereby incorporated by reference.

BACKGROUND

The disclosure relates to an outside protection apparatus for a vehicle.

On a road outside a vehicle, there are present other moving objects, pedestrians, cyclists, riders, and the like. Vehicles have a possibility of colliding with such outside persons and the like during traveling or during parking or stopping. Thus, it has been conceived to provide a vehicle with an outside protection apparatus (Japanese Unexamined Patent Application Publication (JP-A) No. 2017-178205).

SUMMARY

An aspect of the disclosure provides an outside protection apparatus for a vehicle. The apparatus includes an outside airbag device, a collision detector, and a controller. The outside airbag device includes an expandable member configured to be expanded rearward from a front portion of a body of the vehicle so as to be overlaid on a hood of the body, and an inflator configured to expand the expandable member. The collision detector is configured to predict or detect a collision between the body and a person outside the vehicle. The controller is configured to expand the expandable member of the outside airbag device when the collision detector predicts or detects a collision. The expandable member includes a front bag portion configured to be expanded at the front portion of the body so as to be overlaid on the hood, a rear bag portion configured to be expanded in a location closer to rear than the front bag portion, and a tensile member coupled together with the rear bag portion to the body. The rear bag portion is expandable in the location closer to the rear than the front bag portion by the tensile member so as to stand on the hood.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

It is conceivable for a vehicle to expand, instead of moving a bonnet hood as in JP-A, an airbag for a person outside a vehicle (hereinafter, called "outside person"), for example, on a bonnet hood or in front of a windshield and pillars at left and right two side portions of the windshield. Using such an outside airbag device may avoid a direct collision of an outside person with a vehicle.

However, this may still be insufficient as protection of an outside person.

For outside protection apparatuses for vehicles, a further improvement in protection of outside persons is desirably addressed.

Figure 1A:
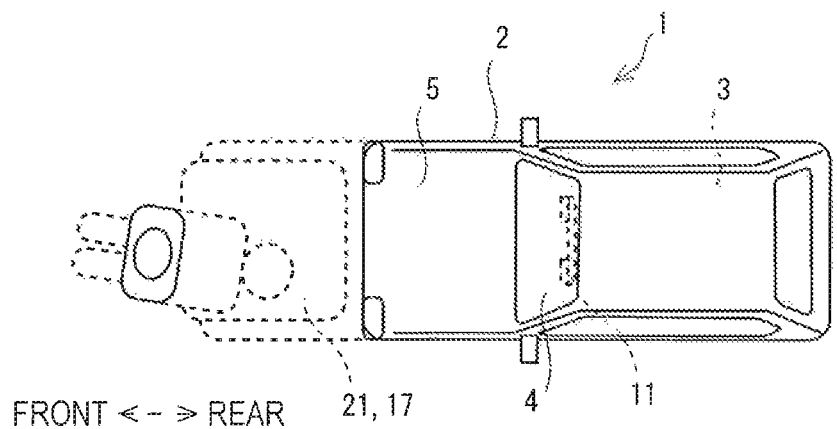
FIG. 1A and FIG. 1B illustrate an automobile according to an embodiment of the disclosure.
Figure 1B:
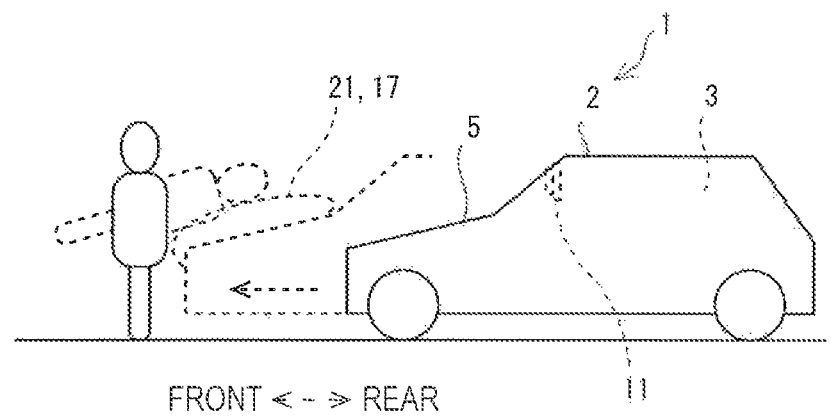

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. FIG. 1A and FIG. 1B illustrate an automobile 1 according to the embodiment of the disclosure.

FIG. 1A is a top view of the automobile 1. FIG. 1B is a left side view of the automobile 1. FIG. 1A and FIG. 1B illustrate a pedestrian, together with the automobile 1, as an outside person outside the automobile 1. In addition, for example, cyclists, riders, and the like may be present outside the automobile 1. These outside persons may traverse by crossing in front of the automobile 1 that travels. Then, the automobile 1 has a possibility of colliding with the persons that intend to cross in front of the automobile 1.

The automobile 1 in FIG. 1A and FIG. 1B is an example of a vehicle. The automobile 1 includes a body 2. In front of a cabin 3 of the body 2, a windshield 4 is provided. At the front portion of the body 2 on the front side from the windshield 4, a bonnet hood 5 is provided to be openable and closable.

Figure 2:
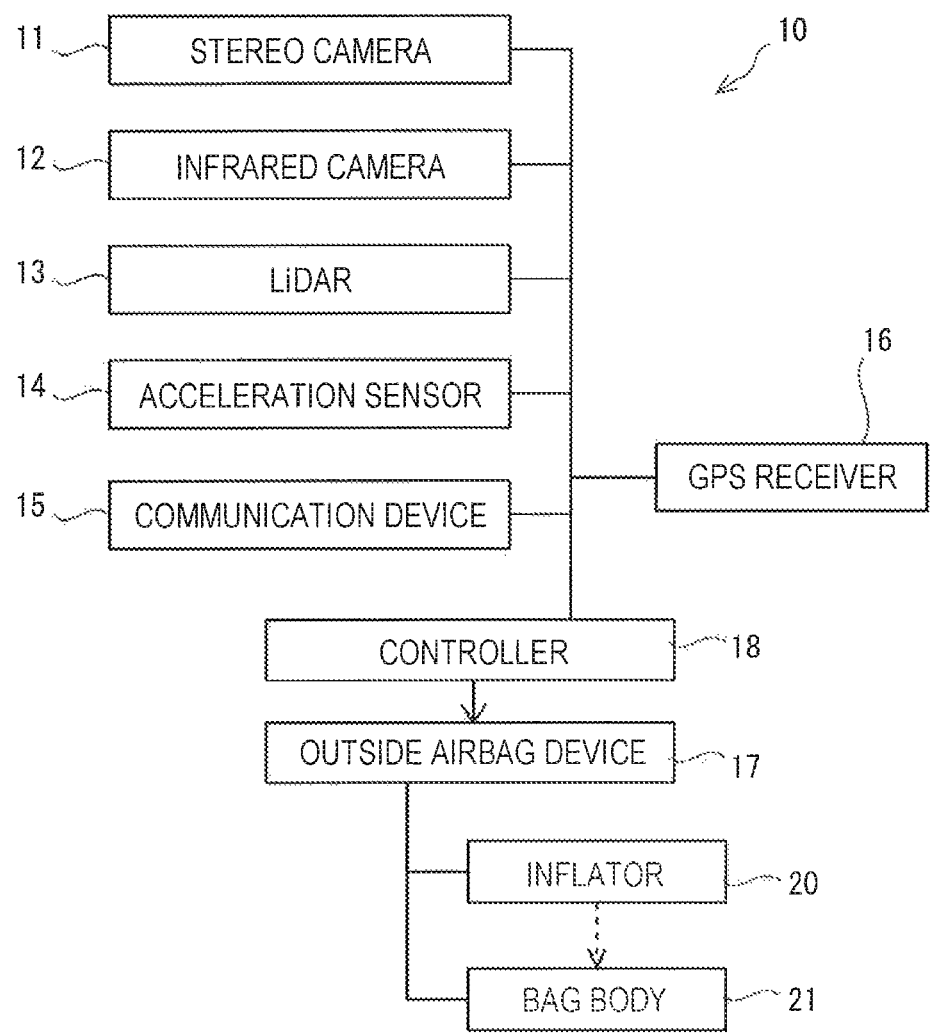
FIG. 2 is a block diagram of an outside protection apparatus of the automobile in FIG. 1A and FIG. 1B.

FIG. 2 is a block diagram of an outside protection apparatus 10 of the automobile 1 in FIG. 1A and FIG. 1B.

The outside protection apparatus 10 in FIG. 2 includes a stereo camera 11, an infrared camera 12, a LiDAR 13, an acceleration sensor 14, a communication device 15, a GPS receiver 16, an outside airbag device 17, and a controller 18 to which these are coupled. Each of these sensors and devices of the outside protection apparatus 10 may be coupled to a CPU as the controller 18 by a vehicle network (not illustrated).

The stereo camera 11 is disposed at, for example, a front portion of the cabin 3, as illustrated in FIG. 1A and FIG. 1B, to be directed to the front. The stereo camera 11 includes a plurality of imaging devices disposed side by side in a vehicle width direction. The stereo camera 11 images an outside person and the like imaged by the plurality of imaging devices. The stereo camera 11 may calculate a direction and a distance based on the body 2 regarding an imaged outside person. The stereo camera 11 may calculate, on the basis of the position of an outside person that is a subject in images imaged by the plurality of imaging devices, the direction and the distance of the subject by, for example, triangulation or the like. In addition, the stereo camera 11 may calculate presence/absence of the movement, the movement direction, the movement velocity, and the like of a subject from changes in the position of the subject in images imaged by shifting time.

The infrared camera 12 is disposed, for example, as with the stereo camera 11, at a front portion of the cabin 3 to be directed to the front. The infrared camera 12 images an infrared image in which an outside person and the like are imaged.

The LiDAR 13 is disposed at, for example, a front portion of the body 2 to be directed to the front. The LiDAR 13 emits light toward the front and, on the basis of reflection light reflected by an outside person in front of the body 2, obtains the direction, the distance, the velocity, and the like of a subject.

The body 2 is provided with the acceleration sensor 14. Acceleration that is applied to the acceleration sensor 14 is detected. When the body 2 comes into contact with a moving object, such as a person, the acceleration sensor 14 detects large acceleration such as that not generated during normal traveling. In this case, the acceleration sensor 14 may output detection of a collision. That is, the acceleration sensor 14 may predicts or detects a collision between the body 2 and other moving objects. In one embodiment, the acceleration sensor 14 may serve as a "collision detector".

The communication device 15 communicates through wireless communication with the other moving objects, for example, the other communication devices 15 of the other automobiles 1 and pedestrians, base stations disposed along roads, and the like. The communication device 15 may obtain the current position, the movement direction, the movement velocity, and the like of the other moving objects from the other communication devices 15.

The GPS receiver 16 receives radio waves from GPS satellites and the like and obtains the current position, the movement velocity, and the like of the own automobile. The outside airbag device 17 includes, for example, an expandable member 21 configured to be expanded so as to be overlaid on the outer surface of the body 2 of the automobile 1, and an inflator 20 configured to expand the expandable member 21. The expandable member 21 may include, for example, nylon or the other resin fiber to have smooth surfaces. For example, as illustrated in FIG. 1A and FIG. 1B, the expandable member 21 may be expanded rearward from the front portion of the body 2 so as to be overlaid on the bonnet hood 5 at the front portion of the body 2. In this case, when the upper body of an outside person that comes into contact with the front of the body 2 falls down toward the front portion of the body 2, the expandable member 21 that is to be expanded on the bonnet hood 5 is expanded between the upper body and the bonnet hood 5. The body of the outside person that comes into contact with the body 2 is suppressed from easily coming into direct contact with the bonnet hood 5. As a result of the expanded expandable member 21 being flexed or contracted by the load of the body of the outside person, strong impact is suppressed from being easily applied to the body. The expanded expandable member 21 can absorb the impact that is to be applied to the outside person.

The controller 18 is, for example, a CPU. The controller 18 may be provided as, for example, a CPU dedicated to the outside airbag device 17 in the automobile 1 or may be provided as a CPU of inside and outside protection apparatuses of the automobile 1 in the automobile 1. The CPU reads a program from a storage, such as a ROM, and executes the program. Thus, the CPU serves as the controller 18 of the outside airbag device 17 for protecting at least an outside person. The controller 18 of the outside airbag device 17 obtains, from collision detectors, such as the stereo camera 11, the infrared camera 12, the LiDAR 13, the acceleration sensor 14, and the communication device 15, information on pedestrians, cyclists, riders, or the like that are on a route of the automobile 1 or that intend to enter the route. When a collision with an outside person is predicted or detected on the basis of the obtained information, the CPU controls expansion of the expandable member 21 of the outside airbag device 17.

Figure 3:
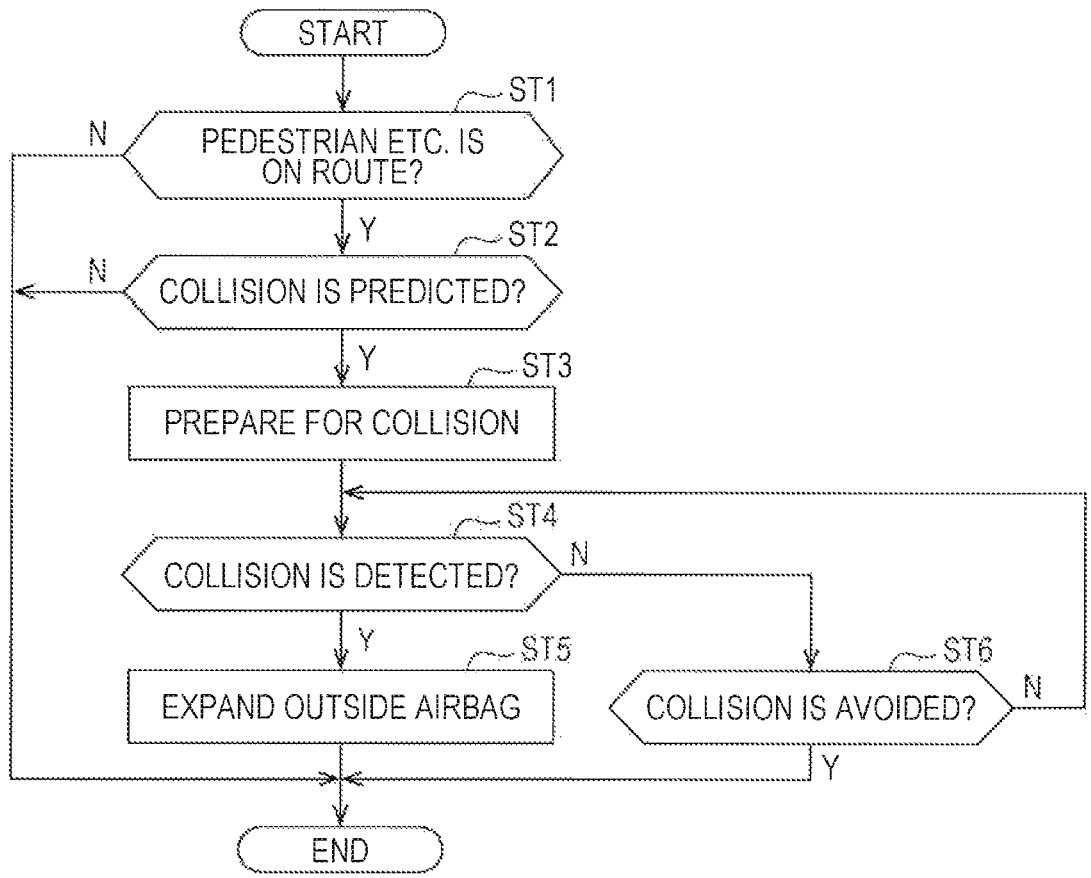
FIG. 3 is a flow chart of outside protection control by a controller in FIG. 2.

FIG. 3 is a flow chart of outside protection control by the controller 18 in FIG. 2.

The controller 18 executes the outside protection control in FIG. 3 repeatedly when, for example, the automobile 1 travels. The controller 18 executes the outside protection control in FIG. 3 every time when obtaining new information.

In a step ST1, the controller 18 determines whether a pedestrian and the like are present on a route of the own automobile on the basis of newly obtained information on outside persons. The controller 18 may determine whether pedestrians and the like are present on a route of the own automobile on the basis of, for example, whether the position of a detected outside person is on the route, whether the movement direction of the detected outside person intersects the route, and the like. When a pedestrian and the like are not present on the route of the own automobile, the controller 18 ends the processing in FIG. 3. When a pedestrian and the like are present on the route of the own automobile, the controller 18 causes the processing to proceed to a step ST2.

In the step ST2, the controller 18 predicts a collision with a pedestrian and the like present on the route of the own automobile. The controller 18 may predict a collision with a pedestrian and the like on the route of the own automobile on the basis of, for example, whether a time difference between a time when the own automobile reaches the position of the pedestrian or the position of intersection and a time when the pedestrian reaches the position of intersection is a predetermined value or less. When a collision with a pedestrian and the like on the route of the own automobile is not predicted, the controller 18 ends the processing in FIG. 3. When a collision with a pedestrian and the like on the route of the own automobile is predicted, the controller 18 causes the processing to proceed to a step ST3.

In the step ST3, the controller 18 starts preparation for a collision with a pedestrian and the like on the route of the own automobile. For example, the controller 18 causes the outside airbag device 17 to start. For example, the outside airbag device 17 is caused to enter a state in which the inflator 20 is able to jet a gas having a high temperature and a high pressure in response to an input of an ignition signal. For example, when the expansion start location and the expansion start direction of the expandable member 21 are adjustable, the outside airbag device 17 adjusts the expansion start location and the expansion start direction of the expandable member 21 so that the expandable member 21 is expanded from a portion that is predicted to collide with a pedestrian.

In step ST4, the controller 18 detects a predicted collision with a pedestrian and the like on the basis of presence/absence of collision detection by the acceleration sensor 14. When a collision is detected by the acceleration sensor 14, the controller 18 causes the processing to proceed to a step ST5. When no collision is detected by the acceleration sensor 14, the controller 18 causes the processing to proceed to a step ST6.

In the step ST5, the controller 18 expands the outside airbag. The controller 18 outputs an ignition signal to the outside airbag device 17. The inflator 20 of the outside airbag device 17 jets a high-pressure gas into the expandable member 21. The expandable member 21 is expanded on the bonnet hood 5. Thus, the controller 18 expands the expandable member 21 of the outside airbag device 17 on the basis of prediction or detection of a collision between the body 2 and the other moving object.

In a step ST6, the controller 18 determines whether a collision is avoided on the basis of information that is newly obtained after the determination in the step ST1. The controller 18 may determine whether a collision with a pedestrian and the like for which a collision is predicted is avoided on the basis of, for example, whether the position of an outside person for which a collision is predicted has moved to the outside of the route, whether the movement direction of a detected outside person has changed and avoided intersection with the route, and the like. When a collision is avoided, the controller 18 ends the processing in FIG. 3. When a collision is not avoided, the controller 18 returns the processing to the step ST4. In this case, the controller 18 repeats the processing in the step ST4 and the step ST6 until a collision is detected or avoided.

Meanwhile, in such an automobile 1 according to the embodiment, an airbag for an outside person can be expanded on the bonnet hood 5. By using such an outside airbag device 17, a direct collision of an outside person with the body 2 can be avoided.

However, this may still be insufficient as protection of an outside person.

For example, after a direct collision of an outside person with the body 2 is avoided by the expanded expandable member 21, the outside person may have a possibility of dropping down to the left or the right while moving rearward on the expanded expandable member 21. When an outside person drops down to a side of the automobile 1, there is a possibility of the outside person secondarily colliding with the other automobile 1 or the like that travels on an adjacent lane.

Figure 4:
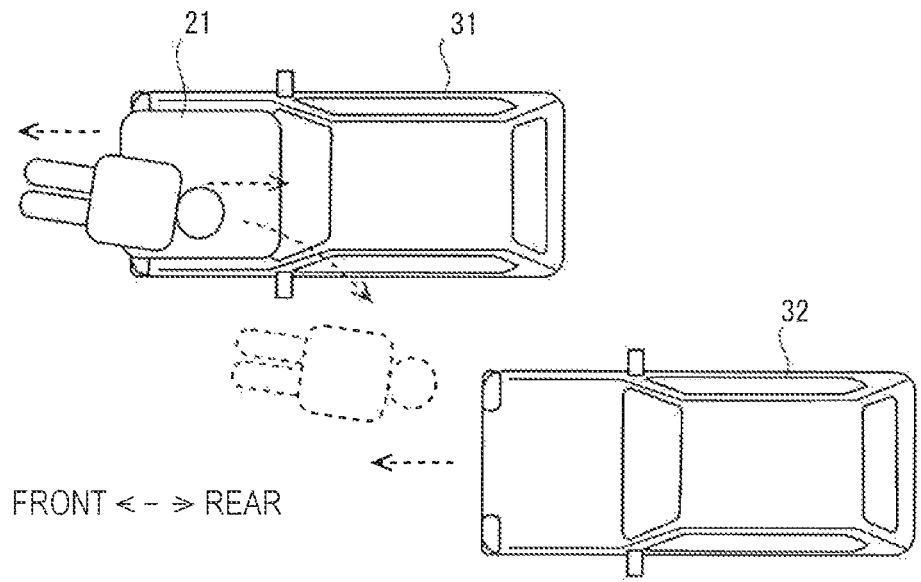
FIG. 4 illustrates a secondary collision predictable for an outside pedestrian, cyclist, or the like that has collided with a first automobile.

FIG. 4 illustrates a secondary collision predictable for an outside pedestrian, cyclist, or the like that has collided with a first automobile 30.

FIG. 4 illustrates an outside pedestrian, the first automobile 30 that has collided with the pedestrian, and a second automobile 31 that intends to pass a side of the first automobile 30.

The pedestrian that has collided with the first automobile 30 is supposed to be first placed on the expandable member 21 that is expanded on the bonnet hood 5. Then, the pedestrian that has collided has a possibility of, for example, sliding rearward on the expandable member 21. In this case, the pedestrian that has collided has a possibility of moving obliquely in the vehicle width direction while sliding rearward after being placed on the expandable member 21 that is expanded on the bonnet hood 5. In this case, when movement in the vehicle width direction is large, the pedestrian that has collided has a possibility of dropping from on the bonnet hood 5 to a side of the first automobile 30. When the second automobile 31 intends to pass a side of the first automobile 30, the pedestrian that has dropped has a possibility of further coming into contact with the second automobile 31.

Thus, for the outside protection apparatus 10 of the automobile 1, a further improvement in protection of outside persons is desirably addressed.

Figure 5A:
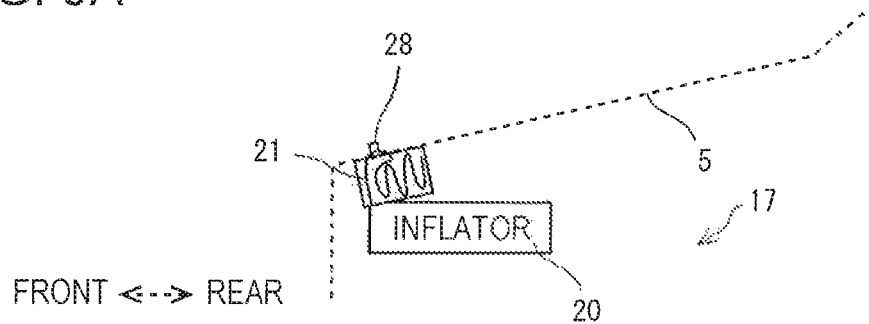
FIG. 5A, FIG. 5B, and FIG. 5C illustrate an outside airbag device according to the embodiment of the disclosure.
Figure 5B:
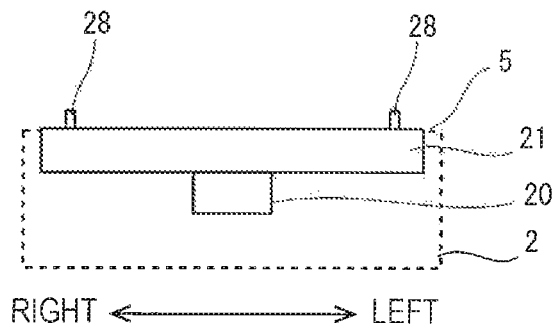
Figure 5C:
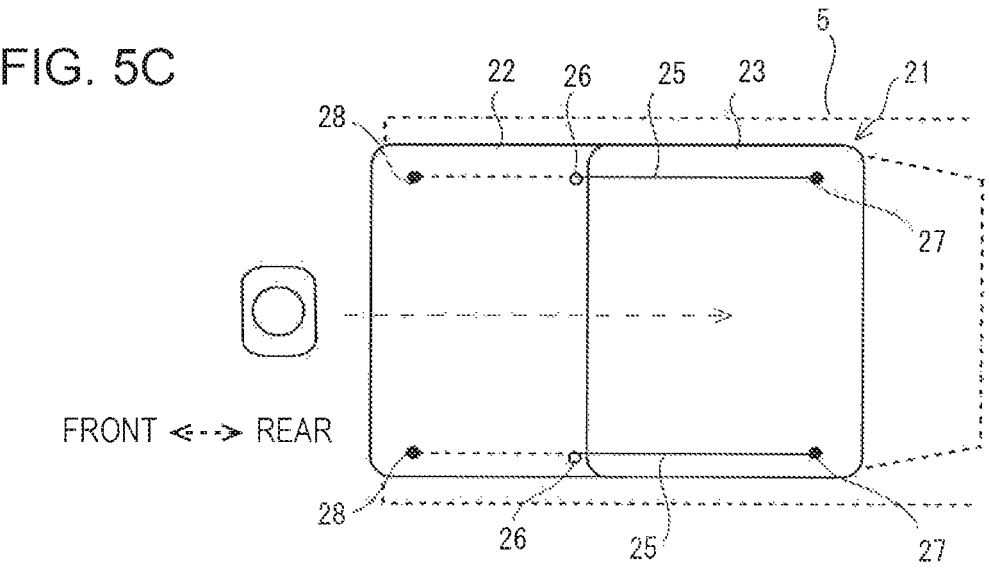

FIG. 5A, FIG. 5B, and FIG. 5C illustrate the outside airbag device 17 according to the embodiment of the disclosure.

FIG. 5A is a side view of a major configuration of the outside airbag device 17 before expansion.

FIG. 5B is a front view of the major configuration of the outside airbag device 17 before expansion in FIG. 5A.

FIG. 5C is a top view of a state in which the expandable member 21 of the outside airbag device 17 is expanded. In FIG. 5C, the load of an outside person in front of the body 2 is not applied to the expanded expandable member 21.

Figure 6A:
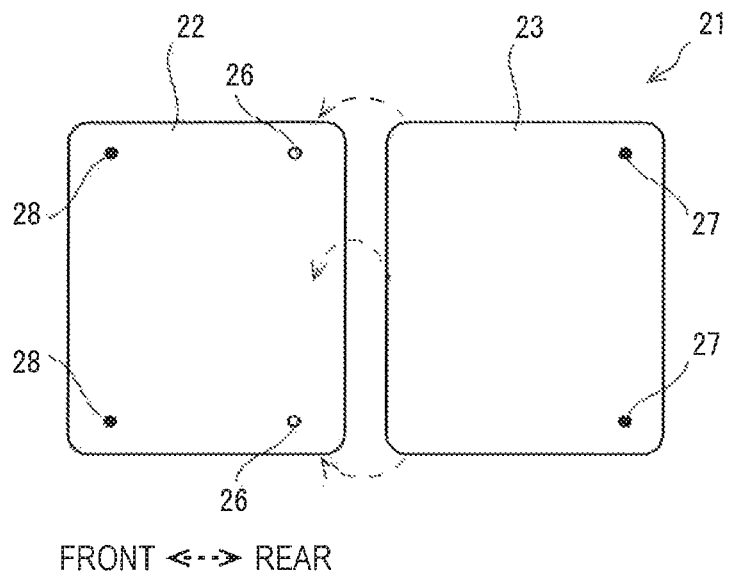
FIG. 6A and FIG. 6B illustrate an expandable member in FIG. 5A, FIG. 5B, and FIG. 5C.
Figure 6B:
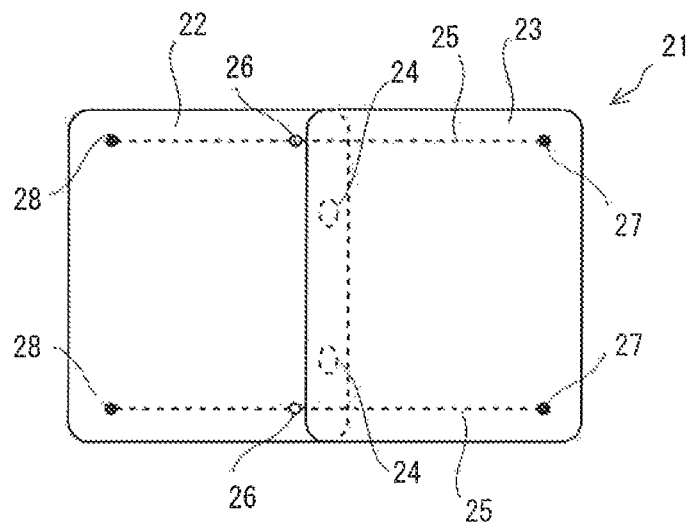

FIG. 6A and FIG. 6B illustrate the expandable member 21 in FIG. 5A, FIG. 5B, and FIG. 5C.

FIG. 6A is an illustration in which a front bag portion 22 and a rear bag portion 23 that constitute the expandable member 21 are dismantled.

FIG. 6B is an illustration of a state in which a front portion of the rear bag portion 23 is overlaid on a rear portion of the front bag portion 22 to thereby constitute the expandable member 21.

As illustrated in FIGS. 5A, 5B, and 5C and FIGS. 6A and 6B, the outside airbag device 17 includes the inflator 20, the expandable member 21, and a left-right pair of fixing members 28.

As illustrated in FIG. 6A and FIG. 6B, the expandable member 21 includes the front bag portion 22, the rear bag portion 23, communication valves 24 that make communication therebetween, and a left-right pair of tensile members 25.

As illustrated in FIG. 6A, the front bag portion 22 and the rear bag portion 23 are basically bag bodies that are expandable separately.

As illustrated in FIG. 6B, the rear bag portion 23 is coupled to the front bag portion 22 with the front portion of the rear bag portion 23 being overlaid on the rear portion of the front bag portion 22. The rear bag portion 23 and the front bag portion 22 may be coupled to each other by being bonded to each other or may be coupled to each other by being sewed together by a tether.

The communication valves 24 are provided at a portion where the rear bag portion 23 and the front bag portion 22 are overlaid on each other so as to pass through the rear bag portion 23 and the front bag portion 22. The communication valves 24 enable ventilation between the front bag portion 22 and the rear bag portion 23, which are basically separate bag bodies. Part of the high-pressure gas that expands the front bag portion 22 can flow into the rear bag portion 23 through the communication valves 24. The communication valves 24 may be constantly opened or may be closed at the time of a start of expansion and opened when, for example, the pressure in the front bag portion 22 is equal to or higher than a threshold value or when the load of an outside person is applied to the front bag portion 22.

The expandable member 21 constituted by the front bag portion 22 and the rear bag portion 23 that are coupled to each other is further provided with the left-right pair of the tensile members 25. The tensile members 25 may be, for example, tethers. The tensile members 25 are provided, in the expandable member 21, from the front portion of the front bag portion 22 to the rear portion of the rear bag portion 23. The front halves of the tensile members 25 are provided in the inner portion of the front bag portion 22 through through holes 26 formed in the upper surface of the rear portion of the front bag portion 22. The rear halves of the tensile members 25 are provided on the upper surface of the rear bag portion 23. The rear ends of the tensile members 25 are fixed and coupled to two side portions 27 of the upper surface of the rear portion of the rear bag portion 23 in the vehicle width direction.

As illustrated in FIG. 5A, FIG. 5B, and FIG. 5C, the left-right pair of fixing members 28 are provided, in the front portion of the body 2, at the two side portions 27 in the vehicle width direction. The front portion of the front bag portion 22 of the expandable member 21 is fixed to the body 2 by these plurality of fixing members 28. Here, as described later, only the lower surface of the front bag portion 22 is fixed to the body 2 by the fixing members 28. The front ends of the left-right pair of tensile members 25 that pass through the front bag portion 22 are fixed to the fixing members 28 at left and right corresponding thereto. Consequently, the tensile members 25 pass through the front bag portion 22 with respective one ends being coupled to the body 2 on the inner side of the rear bag portion 23 by the fixing members 28 and respective other ends being coupled to the upper surface of the rear portion of the rear bag portion 23. The one ends of the tensile members 25 are coupled to portions of the body 2 on the front side from the expansion location of the rear bag portion 23. The plurality of fixing members 28 and the plurality of tensile members 25 are provided as a plurality of sets so as to be divided at left and right to avoid a center portion of the body 2 in the vehicle width direction.

As illustrated in FIG. 5A, FIG. 5B, and FIG. 5C, the inflator 20 is provided at the center in the vehicle width direction in the front portion of the body 2. The inflator 20 is coupled to a front bag body and jets a high-pressure gas into the front bag body. The inflator 20 may be coupled to the front bag body by a tube or the like and provided in a location displaced toward the rear of the body 2, for example, in a location at the rear from an engine and the like.

As illustrated in FIG. 5C, due to such a configuration, the front bag portion 22 of the expandable member 21 is expanded at the front portion of the body 2 so as to be overlaid on the bonnet hood 5. The rear bag portion 23 is expanded in a location closer than the front bag portion 22 to the rear. The front bag portion 22 and the rear bag portion 23 of the expandable member 21 are expanded in a wide width substantially identical to the width of the body 2 to extend in the front-rear direction so as to cover the entirety of the bonnet hood 5. It is desirable that the inflator 20 be able to jet a large amount of a high-pressure gas, basically, so that the entirety of the front bag portion 22 and the rear bag portion 23 can be suitably expanded. It is also desirable that the inflator 20 be able to generate a high-pressure gas in a short time so that the front bag portion 22 can be fully expanded instantaneously and, further, the rear bag portion 23 can be fully expanded. It is desirable that the inflator 20 be a high-performance inflator compared with an inflator for an occupant protection apparatus used in the cabin 3 of the automobile 1.

FIG. 7A, FIG. 7B, FIG. 7C, and FIG. 7D schematically illustrate an operation of protecting an outside person by the expandable member 21 in FIG. 5A, FIG. 5B, and FIG. 5C.

Figure 7A:
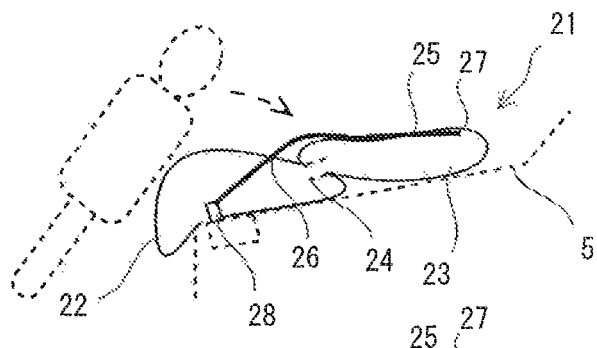
FIG. 7A, FIG. 7B, FIG. 7C, and FIG. 7D schematically illustrate an operation of protecting an outside person by the expandable member in FIG. 5A, FIG. 5B, and FIG. 5C.

FIG. 7A illustrates a state before an outside person comes into contact with the body 2. Here, the front bag portion 22 of the expandable member 21 is expanded to the maximum extent by a high-pressure gas that is jetted from the inflator 20. The rear bag portion 23 starts to be expand as a result of being injected with the high-pressure gas through the front bag portion 22.

Figure 7B:
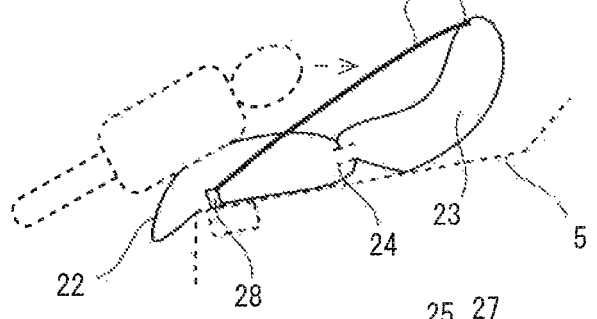

FIG. 7B illustrates a state in which the outside person is placed on the front bag portion 22 of the expandable member 21. Being applied with the load of the outside person, the front bag portion 22 is slightly contracted and flattened. As a result of the high-pressure gas moving from the front bag portion 22 before contraction to the rear bag portion 23, the rear bag portion 23 is expanded to the maximum extent. The upper portion of the rear bag portion 23 that is expanded to the maximum extent is pulled forward by the tensile members 25.

Figure 7C:
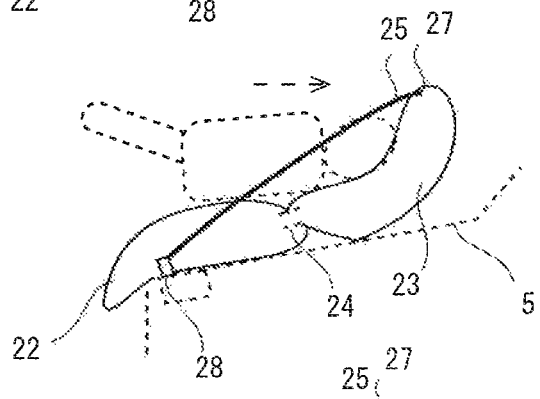

FIG. 7C illustrates a state in which the outside person slides and moves rearward from the front bag portion 22 of the expandable member 21. The outside person that has fallen down onto the front bag portion 22 slides and starts to move on the front bag portion 22 toward the rear of the body 2. At the rear, the expanded rear bag portion 23 stands.

Figure 7D:
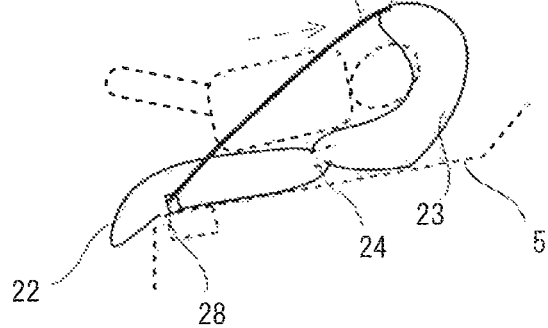

FIG. 7D illustrates a state in which the outside person is caught by the rear bag portion 23 that stands on the bonnet hood 5. The person that slides and moves on the front bag portion 22 toward the rear of the body 2 comes into contact with the rear bag portion 23 that stands at the rear. The lower edge portion of the standing rear bag portion 23 is fixed to the body 2 by the fixing members 28 through the front bag portion 22. The left and right ends of the upper edge portion of the rear bag portion 23 are fixed to the body 2 by the fixing members 28 through the pair of tensile members 25. Consequently, a portion of the standing rear bag portion 23 to which the load of the outside person is applied is recessed rearward. The rear bag portion 23 can be deformed so as to surround the outside person from the periphery with the recessed portion as the center. The rear bag portion 23 can catch an outside person.

As above, in the embodiment, the outside airbag device 17 is expanded when contact with an outside person is predicted or detected. The outside airbag device 17 expands the expandable member 21 rearward from the front portion of the body 2 so as to be overlaid on the automobile 1. The expandable member 21 includes the front bag portion 22 configured to be expanded at the front portion of the body 2 so as to be overlaid on the bonnet hood 5. Consequently, due to the expandable member 21 that is expanded so as to be overlaid on the bonnet hood 5, which is the outer surface of the body 2 of the automobile 1, direct contact of an outside person with the body 2 can be avoided, and an impact to be applied to the outside person when the outside person falls down toward the bonnet hood 5 can be absorbed.

Further, the expandable member 21 configured to be expanded rearward from the front portion of the body 2 so as to be overlaid on the bonnet hood 5 of the body 2 includes the rear bag portion 23 configured to be expanded in a location closer than the front bag portion 22 to the rear. The rear bag portion 23 is expandable in the location closer than the front bag portion 22 to the rear by being pulled forward by the tensile force of the tensile members 25 coupled at the respective one ends to the body 2, so as to stand on the bonnet hood 5 when an outside person is moved from the front bag portion 22. The outside person that is supposed to move rearward after falling down onto the front bag portion 22 comes into contact with the rear bag portion 23 expanded to stand on the bonnet hood 5 and is caught by the rear bag portion 23. The outside person is caught by the rear bag portion 23 after falling down onto the front bag portion 22 on the bonnet hood 5 and suppressed from easily falling down to the left or the right while moving toward the rear of the body 2. Moreover, because the rear bag portion 23, which is a portion that catches an outside person, is a bag portion, the outside person is suppressed from being easily applied with a sudden impact when being caught by the rear bag portion 23.

In the embodiment, the front portion of the rear bag portion 23 configured to be expanded in a location closer than the front bag portion 22 to the rear is coupled to the rear portion of the front bag portion 22, and the tensile members 25 coupled at the respective one ends to the body 2 are coupled to the rear portion of the rear bag portion 23. In particular, the tensile members 25 may be coupled to a portion of the body 2 on the front side from the expansion location of the rear bag portion 23. Consequently, the rear bag portion 23 can be expanded in a location closer than the front bag portion 22 to the rear so as to stand on the bonnet hood 5 by being pulled forward by the tensile force of the tensile members 25. By standing on the bonnet hood 5, when an outside person is moved from the front bag portion 22, the rear bag portion 23 can catch the outside person.

In the embodiment, the fixing members 28 fix the front bag portion 22 to the body 2. In particular, the fixing members 28 fix the front bag portion 22 to a portion of the body 2 on the front side from the expansion location of the rear bag portion 23. Consequently, the front bag portion 22 remains at the portion on the front side from the expansion location of the rear bag portion 23, even when an outside person falls down onto the front bag portion 22. An outside person that has fallen down onto the front bag portion 22 slides on the front bag portion 22 and moves toward the rear bag portion 23 at the rear.

The tensile members 25 coupled at the respective other ends to the upper surface of the rear portion of the rear bag portion 23 to cause the rear bag portion 23 to stand pass through the front bag portion 22 and are coupled at the respective one ends to the body 2 by the fixing members 28 on the inner side of the rear bag portion 23. Therefore, while standing the rear bag portion 23 suitably by being fixed to the body 2 in a location on the front side from the expansion location of the rear bag portion 23, the tensile members 25 can be suppressed from coming into direct contact, similarly to when being exposed on the front bag portion 22, with an outside person that falls down onto the front bag portion 22. The tensile members 25 can be suitably provided so as not to be an obstruction and to exert a predetermined function.

In particular, in the embodiment, the fixing members 28 and the tensile members 25 are provided as two sets so as to be divided at the left and the right to avoid the center portion of the body 2 in the vehicle width direction, and the two tensile members 25 are coupled to the two side portions 27 of the upper surface of the rear portion of the rear bag portion 23 in the vehicle width direction. Therefore, the tensile members 25 are suppressed from easily interfering with an outside person that is supposed to fall onto the front bag portion 22 and also suppressed from easily interfering with an outside person that is supposed to move from the front bag portion 22 to the rear bag portion 23. An outside person may be easily protected by the front bag portion 22 and the standing rear bag portion 23 without being interfered by the tensile members 25. In particular, an outside person is caught on the rear bag portion 23 such that the center portion of the rear bag portion 23 is bent rearward, and the outside person is centered on the rear bag portion 23 after being caught and suppressed from easily dropping from the rear bag portion 23. Thus, performance of catching an outside person by the rear bag portion 23 can be expected to be improved.

In the present embodiment, the rear bag portion 23 is coupled to the front bag portion 22 such that the front portion of the rear bag portion 23 is overlaid on the rear portion of the front bag portion 22. In this overlaid state, expansion is started. Consequently, when an outside person that has fallen down onto the front bag portion 22 starts to move rearward, the outside person can move from the front bag portion 22 to the rear bag portion 23 without sinking between the front bag portion 22 and the rear bag portion 23. An up-down motion after falling-down can be suppressed as if the front bag portion 22 and the rear bag portion 23 are one bag body. An unnecessary movement and an unnecessary motion due to the up-down motion after falling-down can be suppressed.

Moreover, the communication valves 24 are provided at a portion where the rear bag portion 23 and the front bag portion 22 are overlaid on each other. Consequently, the rear bag portion 23 can be expanded by the high-pressure gas of the inflator 20 supplied through the front bag portion 22. In particular, when the load of an outside person is applied to the front bag portion 22, the high-pressure gas that attempts to escape from the front bag portion 22 is caused to be supplied to the rear bag portion 23 through the communication valves 24. Even when the amount of gas generated by the inflator 20 is insufficient to fully expand the rear bag portion 23 together with the front bag portion 22, the rear bag portion 23 can be suitably expanded by the high-pressure gas that attempts to escape from the front bag portion 22. As a result of an outside person falling down onto the front bag portion 22, the rear bag portion 23 can be suitably expanded and, in the suitably expanded state, can catch the outside person that is moved rearward from the front bag portion 22.

The above embodiment is a suitable example of the present disclosure. The present disclosure is, however, not limited thereto and can be variously modified and changed in a range not deviating from the gist of the disclosure.

In the above-described embodiment, the tensile members 25 are fixed to the body 2 through the inner side of the front bag portion 22. Alternatively, for example, the tensile members 25 may be fixed to the body 2 outside the front bag portion 22. Note that, by causing the tensile members 25 to pass through the inner side of the front bag portion 22, the tensile members 25 and an outside person that falls down onto the body 2 are suppressed from easily directly interfering with each other.

In the above-described embodiment, the front bag portion 22 and the rear bag portion 23 are coupled to each other. Alternatively, for example, the rear bag portion 23 may be provided as a body separated from the front bag portion 22 and fixed directly to the body 2 separately from the front bag portion 22. Moreover, the rear bag portion 23 may be configured such that the high-pressure gas flows thereinto through the front bag portion 22 or such that the high-pressure gas flows thereinto from another inflator that differs from the front bag portion 22. Note that, by causing the high-pressure gas to flow thereinto through the front bag portion 22, it is possible to expand the rear bag portion 23 by suitably utilizing the high-pressure gas discharged from the front bag portion 22 that contracts. It is thus possible to reduce the total discharge gas amount and the pressure of the inflator 20.

The invention claimed is:

1. An outside protection apparatus for a vehicle, the apparatus comprising:
   an outside airbag device that comprises:

an expandable member configured to be expanded rearward from a front portion of a body of the vehicle so as to be overlaid on a hood of the body; and
an inflator configured to expand the expandable member;
a collision detector configured to predict or detect a collision between the body and a person outside the vehicle; and
a controller configured to expand the expandable member of the outside airbag device when the collision detector predicts or detects the collision,
wherein the expandable member comprises:
a front bag portion configured to be expanded at the front portion of the body so as to be overlaid on the hood, a rear bag portion configured to be expanded in a location closer to a rear than the front bag portion; and
a tensile member that originates from a location forward of a rear end of the front bag portion and extends rearward so as to couple the rear bag portion to the body, and
wherein the rear bag portion is expandable in the location closer to the rear than the front bag portion by the tensile member so as to stand on the hood in a manner wherein an upper region of the standing rear bag portion is drawn by the tensile member toward the front bag portion as to define, in the expandable member, an upper side facing capture region above the hood that is provided due to a center region of the standing rear bag portion being bent rearward.

2. The outside protection apparatus according to claim 1,
wherein the expandable member further comprises a communication valve,
wherein the rear bag portion is coupled to the front bag portion so as to have a front portion overlaid on a rear portion of the front bag portion, and
wherein the communication valve is disposed at a portion where the rear bag portion and the front bag portion are overlaid on each other.

3. The outside protection apparatus according to claim 1, wherein the tensile member is coupled to a portion of the body on a front side from an expansion location of the rear bag portion.

4. The outside protection apparatus according to claim 3, further comprising:
a fixing member configured to fix the front bag portion to a portion of the body on a front side from an expansion location of the rear bag portion,
wherein the tensile member passes through the front bag portion so that one end of the tensile member is coupled on an inner side of the front bag portion to the body by the fixing member and the other end of the tensile member is coupled to an upper surface of a rear portion of the rear bag portion.

5. The outside protection apparatus according to claim 3, further comprising
at least one pair of fixing members, and the tensile member comprises at least one pair of tensile members, the fixing members in the pair being disposed respectively on a left side and a right side of the body avoiding a center portion of the body, the tensile members in the pair being disposed respectively on the left side and the right side of the body avoiding the center portion of the body in the vehicle width direction, and
wherein the tensile members are coupled to two side portions of an upper surface of a rear portion of the rear bag portion in the vehicle width direction.

6. The outside protection apparatus according to claim 3,
wherein the expandable member further comprises a communication valve,
wherein the rear bag portion is coupled to the front bag portion so as to have a front portion overlaid on a rear portion of the front bag portion, and
wherein the communication valve is disposed at a portion where the rear bag portion and the front bag portion are overlaid on each other.

7. The outside protection apparatus according to claim 1,
wherein a front portion of the rear bag portion is coupled to a rear portion of the front bag portion, and
wherein the tensile member is coupled to a rear portion of the rear bag portion.

8. The outside protection apparatus according to claim 7, further comprising:
a fixing member configured to fix the front bag portion to a portion of the body on a front side from an expansion location of the rear bag portion,
wherein the tensile member passes through the front bag portion so that one end of the tensile member is coupled on an inner side of the front bag portion to the body by the fixing member and the other end of the tensile member is coupled to an upper surface of a rear portion of the rear bag portion.

9. The outside protection apparatus according to claim 7, further comprising
at least one pair of fixing members, and the tensile member comprises at least one pair of tensile members, the fixing members in the pair being disposed respectively on a left side and a right side of the body avoiding a center portion of the body, the tensile members in the pair being disposed respectively on the left side and the right side of the body avoiding the center portion of the body in the vehicle width direction, and
wherein the tensile members are coupled to two side portions of an upper surface of a rear portion of the rear bag portion in the vehicle width direction.

10. The outside protection apparatus according to claim 7,
wherein the expandable member further comprises a communication valve,
wherein the rear bag portion is coupled to the front bag portion so as to have a front portion overlaid on a rear portion of the front bag portion, and
wherein the communication valve is disposed at a portion where the rear bag portion and the front bag portion are overlaid on each other.

11. The outside protection apparatus according to claim 7, wherein the tensile member is coupled to a portion of the body on a front side from an expansion location of the rear bag portion.

12. The outside protection apparatus according to claim 11, further comprising:
a fixing member configured to fix the front bag portion to a portion of the body on a front side from an expansion location of the rear bag portion,
wherein the tensile member passes through the front bag portion so that one end of the tensile member is coupled on an inner side of the front bag portion to the body by the fixing member and the other end of the tensile member is coupled to an upper surface of a rear portion of the rear bag portion.

13. The outside protection apparatus according to claim 11, further comprising
at least one pair of fixing members, and the tensile member comprises at least one pair of tensile members, the fixing members in the pair being disposed respectively on a left side and a right side of the body avoiding a center portion of the body, the tensile members in the pair being disposed respectively on the left side and the right side of the body avoiding the center portion of the body in the vehicle width direction, and wherein the tensile members are coupled to two side portions of an upper surface of a rear portion of the rear bag portion in the vehicle width direction.

14. The outside protection apparatus according to claim 11, wherein the expandable member further comprises a communication valve, wherein the rear bag portion is coupled to the front bag portion so as to have a front portion overlaid on a rear portion of the front bag portion, and wherein the communication valve is disposed at a portion where the rear bag portion and the front bag portion are overlaid on each other.

15. An outside protection apparatus for a vehicle, the apparatus comprising:
an outside airbag device that comprises:
an expandable member configured to be expanded rearward from a front portion of a body of the vehicle so as to be overlaid on a hood of the body; and
an inflator configured to expand the expandable member;
a collision detector configured to predict or detect a collision between the body and a person outside the vehicle; and
a controller configured to expand the expandable member of the outside airbag device when the collision detector predicts or detects the collision,
wherein the expandable member comprises:
a front bag portion configured to be expanded at the front portion of the body so as to be overlaid on the hood, a rear bag portion configured to be expanded in a location closer to a rear than the front bag portion; and
a tensile member coupled together with the rear bag portion to the body, and
wherein the rear bag portion is expandable in the location closer to the rear than the front bag portion by the tensile member so as to stand on the hood, and
wherein a fixing member comprises at least one pair of fixing members and the tensile member comprises at least one pair of tensile members, the fixing members in the pair being disposed respectively on a left side and a right side of the body avoiding a center portion of the body, the tensile members in the pair being disposed respectively on the left side and the right side of the body avoiding the center portion of the body in the vehicle width direction, and
wherein the tensile members are coupled to two side portions of an upper surface of a rear portion of the rear bag portion in the vehicle width direction.

16. An outside protection apparatus for a vehicle, the apparatus comprising:
an outside airbag device that comprises:
an expandable member configured to be expanded rearward from a front portion of a body of the vehicle so as to be overlaid on a hood of the body; and
an inflator configured to expand the expandable member;
a collision detector configured to predict or detect a collision between the body and a person outside the vehicle; and
a controller configured to expand the expandable member of the outside airbag device when the collision detector predicts or detects the collision,
wherein the expandable member comprises:
a front bag portion configured to be expanded at the front portion of the body so as to be overlaid on the hood, a rear bag portion configured to be expanded in a location closer to a rear than the front bag portion; and
a tensile member coupled together with the rear bag portion to the body, and wherein the rear bag portion is expandable in the location closer to the rear than the front bag portion by the tensile member so as to stand on the hood, and
a fixing member configured to fix the front bag portion to a portion of the body on a front side from an expansion location of the rear bag portion, and
wherein the tensile member passes through an internal region of the front bag portion and exits the front bag portion through a surface of the front bag portion and extends rearward so as to extend over the rear bag portion so that one end of the tensile member is coupled on an inner side of the front bag portion to the body by the fixing member and the other end of the tensile member is coupled to an upper surface of a rear portion of the rear bag portion.

17. The outside protection apparatus according to claim 16, wherein the tensile member, in exiting through the surface of the front bag portion, passes through holes formed in the upper surface of the rear portion of the front bag portion.

18. An outside protection apparatus for a vehicle, the apparatus comprising:
an outside airbag device that comprises:
an expandable member configured to be expanded rearward from a front portion of a body of the vehicle so as to be overlaid on a hood of the body; and
an inflator configured to expand the expandable member;
a collision detector configured to predict or detect a collision between the body and a person outside the vehicle; and
circuitry configured to expand the expandable member of the outside airbag device when the collision detector predicts or detects the collision,
wherein the expandable member comprises:
a front bag portion configured to be expanded at the front portion of the body so as to be overlaid on the hood, a rear bag portion configured to be expanded in a location closer to a rear than the front bag portion; and
a tensile member that originates from a location forward of the rear end of the front bag portion and extends rearward so as to couple the rear bag portion to the body, and
wherein the rear bag portion is expandable in the location closer to the rear than the front bag portion by the tensile member so as to stand on the hood in a manner wherein an upper region of the standing rear bag portion is drawn by the tensile member toward the front bag portion as to define, in the expansible member, an upper side facing capture region above the hood that is provided due to a center region of the standing rear bag portion being bent rearward.

19. The outside protection apparatus according to claim 18, wherein a lower surface of a front portion of the rear bag portion is overlaid over a top surface of a rear portion of the front bag portion.

\* \* \* \* \*